INVENTORS
SHUNJI SHIMA
HIDEYOSHI KADOWAKI
EIJI MUTO
ICHIRO OKAZAKI
KOICHI MATSUMURA

BY Sughrue, Rothwell, Mion,
Zinn & Macpeak
ATTORNEYS

United States Patent Office 3,813,300
Patented May 28, 1974

3,813,300
PASTE-TYPE ELECTRODE BACKING PLATE FOR LEAD-ACID BATTERY
Shunji Shima, Hideyoshi Kadowaki, Eiji Muto, Ichiro Okazaki, and Koichi Matsumura, Kyoto, Japan, assignors to Japan Storage Battery Co., Ltd., Kyoto, Japan
Continuation of abandoned application Ser. No. 91,646, Nov. 23, 1970. This application Aug. 31, 1972, Ser. No. 285,278
Claims priority, application Japan, Feb. 12, 1970, 45/12,102; July 22, 1970, 45/64,607
Int. Cl. H01m 35/04
U.S. Cl. 136—38                        7 Claims

ABSTRACT OF THE DISCLOSURE

A backing plate for a paste-type electrode to be used for a lead-acid battery, comprising a plastic support or grid for an active conducting material and a current collector, the support being comprised of a frame and a plurality of crosspieces arranged in crisscross fashsion in the space surrounded by the frame, each crosspiece having a thickness less than that of the frame. The crosspieces are disposed so that the surfaces of the crosspieces facing opposite surfaces of the support are sufficiently spaced from the opposite support surfaces for receiving the active conducting material. The number of the crosspieces spaced from one surface of the frame is substantially the same as the number of the crosspieces spaced from the opposite surface of the frame, the crosspieces being substantailly uniformly arranged in the space defined by the frame. Also, the crosspieces spaced from one surface of the frame are disposed in the spaces defined by the crosspieces spaced from the opposite surface of the frame, and the surfaces between the crosspieces and the frame are continuous throughout the entire space within the frame.

---

This is a continuation of application Ser. No. 91,646, filed Nov. 23, 1970, now abandoned.

BACKGROUND OF THE INVENTION

The present invention relates to a backing plate for a paste-type electrode to be used for a lead-acid battery and, more particularly, it relates to a backing plate for a paste-type electrode to be mainly used as a cathode of a lead-acid battery, the backing plate being composed of a plastic material and the electric conduction to each part of the electrodes being effected by an active material.

As is well known, a grid composed of lead or a lead alloy, such as a lead-antimony alloy and a lead-calcium alloy, is usually used as the backing plate for a paste-type electrode of a lead-acid battery. Although this type of backing plate may be quite excellent from the standpoint of minimizing the internal resistance of the electrode, the employment of such a backing plate is accompanied by various disadvantages. Since lead or a lead alloy having a large specific gravity is used as the material for the backing plate which does not contribute directly to an electricity inducing reaction in a battery, the weight of the electrode and consequently the battery itself is increased needlessly. Also, since the cost of lead is comparatively high, the high cost of the backing plate results in a high production cost of the electrode. Further, an electrode using a grid composed of a lead-antimony alloy which has now been used most generally is subject to large self-discharging.

For overcoming these difficulties, the use of a plastic porous plate provided with conductivity by coating thereon a thin film of lead has been proposed, but since the efficiency for the production of such plate is low and hence the cost thereof is high, such a plastic backing plate has not been used commercially.

SUMMARY OF THE INVENTION

Therefore, an object of the present invention is to provide a backing plate structure of a plastic material in which electric conductivity is provided by the electric conductivity of an active material itself.

Another object of this invention is to provide a backing plate with good retention of an active material packed into it, and with little tendency to drop the active material therefrom.

Still another object of this invention is to provide an electrode backing plate which is not subject to a large amount of self-discharging.

A paste-type electrode backing plate for a lead-acid battery contributes fundamentally to retain an active material on the backing plate and to conduct the electric current between the active material and outer circuits. Therefore, in the case of employing a lightweight and inexpensive plastic material as a backing plate for electrode for supporting an active material, some means for maintaining an electrical connection between the active material of the backing plate and the outer circuits must be applied to the plastic backing plate owing to the non-conductivity of the plastic.

It has been noticed that an active material, in particular, an atcive material for the cathode, has high electric conductivity. The present invention provides a backing plate which is very light, is readily produced and has properties not inferior to those of a backing plate composed of a lead or a lead alloy or a conventional plastic porous plate having a conductive lead film coated thereon, by providing a novel structure for a backing plate composed of a plastic such as polyethylene, polypropylene, polystyrene, an acrylonitrile-styrene copolymer, or an acrylonitrile-butadiene-styrene copolymer, and utilizing the electric conductivity of an active material itself for the electric conductance to each part of the electrodes.

The backing plate of this invention is composed of a plastic support or grid for an active material and a current collector, the support being composed of a frame and plural crosspieces arranged crisscross fashion in the space surrounded by the frame, each crosspiece having a thickness less than that of the frame. The crosspieces are so disposed that the surfaces of the crosspieces facing the opposite surfaces of the support are sufficiently spaced from one of the opposite surfaces of the frame for receiving an active material, the number of the crosspieces spaced from one surface of the frame is substantially the same as the number of crosspieces spaced from the opposite surface of the frame, these crosspieces being substantially uniformly arranged in the space defined by the frame. Also, the crosspieces spaced from one surface of the frame are disposed in the spaces defined by the crosspieces spaced from the opposite surface of the frame, and the spaces surrounded by the inside surfaces of the frame and both side surfaces of the frame are continuous through the whole space within the frame.

BRIEF DESCRIPTION OF THE DRAWINGS

The invention will now be explained by referring to the accompanying drawings, in which.

DESCRIPTION OF THE PREFERRED EMBODIMENTS

Figure 1:
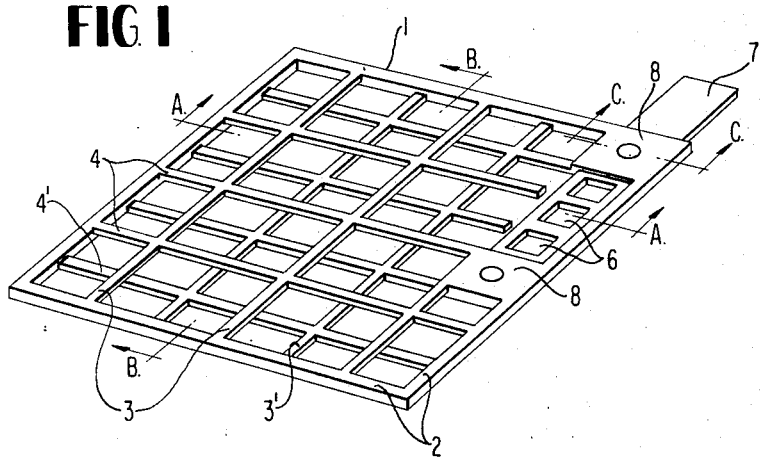
FIG. 1 is a perspective view showing one embodiment of the paste-type electrode backing plate constructed in accordance with the principles of this invention.
Figure 2:
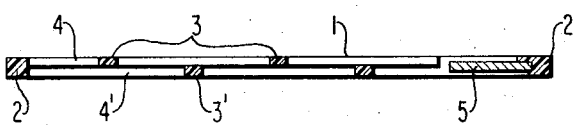
FIG. 2 is a cross sectional view taken substantially along line A—A in FIG. 1.
Figure 3:
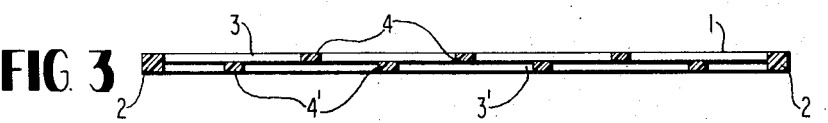
FIG. 3 is a cross sectional view taken substantially along line B—B in FIG. 1.
Figure 4:
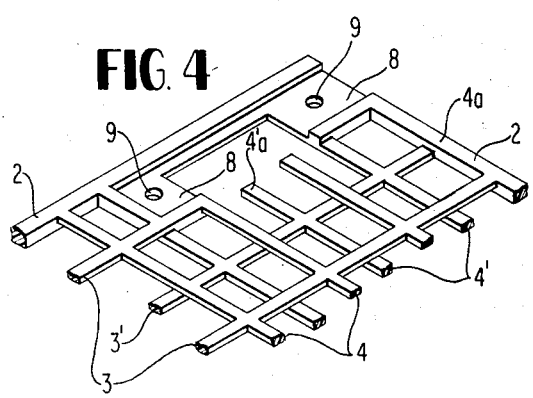
FIG. 4 is a partially sectional perspective view showing one embodiment of a construction for mounting a current collector on the support for active material of the backing plate of this invention.

Now, in FIGS. 1 to 6, the support or backing plate 1 is composed of a frame 2 and crosspieces 3, 3' and 4, 4' installed between the sides of the frame 2 for supporting or retaining an active material to be packed in the space defined by the frame 2. The thickness of each crosspiece is thinner than the thickness of the frame 2 and the surfaces of the crosspieces facing the surfaces of the support are spaced a sufficient distance from the adjacent surfaces of the frame for retaining an active material. The crosspieces may be installed crosswisely to the frame in any desired plural directions. In the example shown in FIGS. 1–6, the crosspieces 3 and 3' meet at right angles with the crosspieces 4 and 4', that is, the crosspieces 3, 3' and 4 and 4' are arranged bidirectionally. The thickness of the crosspieces 3, 3', 4 and 4' preferably is approximately ½ of the thickness of the frame 2. The crosspieces 3 and 4 are so disposed that one surface of each of them is in the same plane as one of the surfaces of the frame, while the crosspieces 3' and 4' are so disposed that one surface of each of them is in the same plane as the opposite surface of the frame, whereby the crosspieces 3 and 4 and the crosspieces 3' and 4' are arranged in two layers. Therefore, the opposite surfaces of the crosspieces 3 and 4 and the crosspieces 3' and 4' are disposed with a spacing of approximately ½ of the thickness of the frame from the other surfaces of the frame. Furthermore, the thickness of the cross portions of the crosspiece 3 and the crosspiece 4' and the thickness of the cross portions of the crosspiece 3' and the crosspiece 4 are substantially the same as the thickness of the frame.

By the aforesaid configuration, the space defined by the inside surfaces of the frame 2 and the both planes of the frame is not completely divided by the crosspieces 3, 3', 4 and 4', and the space partially divided by the crosspieces is connected continuously. Therefore, the active material packed in the space is connected continuously in a body, whereby the electrical connection of the parts of the electrode is effected by the electric conductivity of the active material itself.

Figure 5:
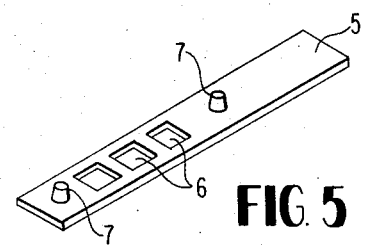
FIG. 5 is a perspective view showing an embodiment of a current collector to be fitted to the active material support shown in FIG. 4.
Figure 6:
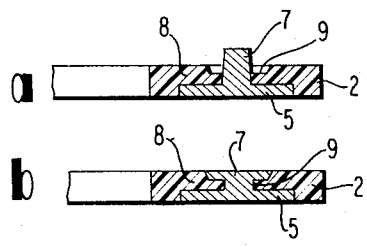
FIGS. 6a and 6b are partial cross sectional views taken along line C—C in FIG. 1, showing the current collector of FIG. 5 and the plastic grid of FIG. 4 before and after they are joined together, respectively.

A current outlet portion will now be explained. As shown in FIG. 5, a current collector 5 is made of lead or a lead alloy and has a thickness thinner than the thickness of the frame of the backing plate 1. The current collector 5 is so secured to the backing plate that a part of the current collector is disposed in the space surrounded by the inside wall of the frame 2 and the opposite planes of the frame 2, while other end of the collector is disposed outside of the frame, as shown in FIG. 1. Also, at least one surface, preferably the opposite surfaces of the portion of the current collector disposed in the space surrounded by the frame, is immersed in an active material when the active material is tamped in the grid to contact the active material and to provide the current collector with good electroconductivity, whereby the passage of the electric current between the active material and outside circuits is easily accomplished. Further, for making the contact between the active material and the current collector 5 more complete, perforations 6 are formed in the current collector 5 which are filed with the active material.

For securing the current collector more strongly to the backing plate 1, two bridging members 8 each having a thickness thinner than that of frame, preferably thinner than that of the thickness of the frame subtracted by the thickness of the current collector, and having perforations 9, are provided on the backing plate 1. Projections 7 to be fitted to the perforations 9 are provided on the current collector 5 and when the current collector is mounted to the backing plate, the projections 7 of the current collector 5 are inserted in the perforations 9 such that the ends of the projections 7 protruding beyond the perforations 9 are deformed to strongly secure the current collector 5 to the bridging members 8, as shown in FIGS. 6a and (b) of the drawings. Also, the ends of the crosspieces 4a and 4a' adjacent to the current collector 5 when the latter is mounted are cut so that they are spaced from the current collector. By such a configuration, oscillations or shocks by or to the current collector when the battery is prepared by using the electrode assembly are not directly transferred to the crosspieces but are transferred thereto through the frame after they are dispersed, whereby the formation of cracks in the active material tamped to the backing plate and thus the reduction of the electroconductivity of the electrode is prevented.

Figure 7:
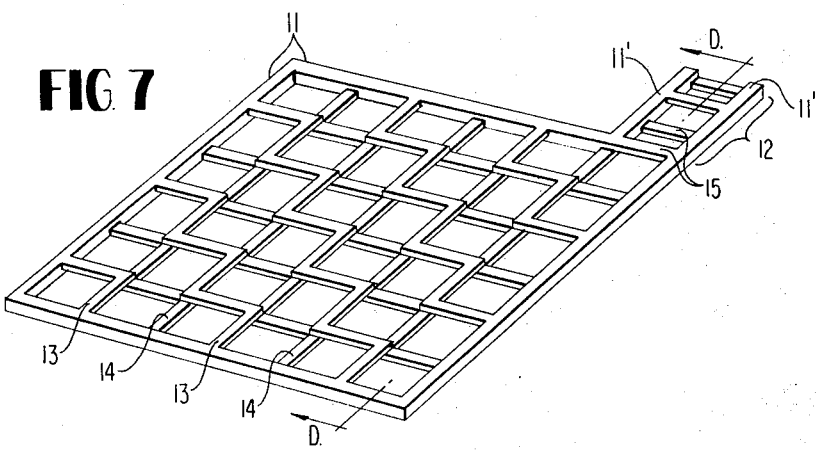
FIG. 7 is a perspective view showing another embodiment of the backing plate of this invention.
Figure 8:
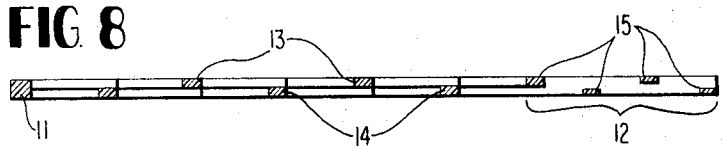
FIG. 8 is a cross sectional view taken substantially along line D—D in FIG. 7.

In FIGS. 7 and 8, which show another embodiment of the present invention, a construction is shown in which a current collector is not employed but the active material is tamped to a current outlet portion thereof and the active material at the current outlet portion is directly connected to an outside electric circuit such as a strap (not shown). A part of a frame 11 which is of a rectangular shape is extended outside in the same plane as the frame to provide a current outlet portion 12. Crosspieces 13 and 14 are provided in the frame for retaining the active material tamped in the space surrounded by the frame. The thickness of each crosspiece is about ½ of the thickness of the frame 11 and each crosspiece preferably is of a zigzag form. The crosspieces 13 are so connected to the frame that one surface thereof is spaced from a plane of the frame, while the crosspieces 14 are so connected to the frame that their opposite surfaces are spaced from the opposite plane of the frame to provide a space for tamping an active material.

Each of turn portions of the crosspieces 13 is made in a body with each of the turn portions of the crosspieces 14. Also, small pieces 15 are provided on the frame portion 11' of the current outlet portion 12 so that a space is provided for tamping the active material thereto. In the backing plate of this embodiment of the invention, the space formed by the inside walls of the frame 11 and frame 11' and the opposite planes of the frame is not divided by the crosspieces 13 and 14 and the small pieces 15, and thus forms a continuous space as a whole. Therefore, when an electrode is prepared by tamping an active material to the support and the current outlet portion, the electric current generated at each part of the electrode passes from the active material to the outside circuit through the current outlet. In addition, in order to reduce the electrical resistivity at the current outlet part of the electrode to as low a value as possible, it is desirable to tamp the active material at the current outlet portion more densely than other portions. Furthermore, a lead coating may be applied to the surface of the active material at the outlet portion in any suitable manner.

In the case of preparing a battery by using an electrode having an active material tamped to the backing plate as mentioned above, it is necessary to connect a part of an outside electric circuit made of a lead alloy, i.e., a strap directly to the active material (e.g. spongy lead) tamped to the aforesaid current outlet portion, and this can be practiced, for example, without reducing the mechanical strength of the plastic backing plate by using a high frequency welding machine (not shown) having a chilling means, or by a method in which molten lead is poured in a metallic mold for casting straps, in which a current outlet portion of the electrode is positioned, and then the molten lead in the metallic mold is chilled rapidly and solidified, whereby the current outlet portion of the electrode is welded in a body to the strap.

Figure 9:
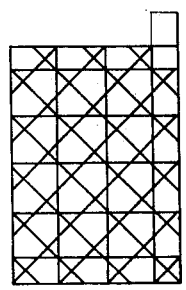
FIGS. 9 and 10 are schematic plan views of supports showing different embodiments of crosspieces for the backing plate of this invention.
Figure 10:
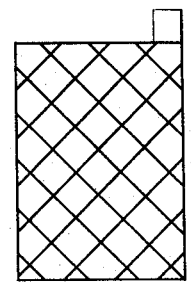

In the embodiments shown in FIGS. 1 and 7, the crosspieces are arranged in a lattice form, but they may be arranged in any desired form if the requirements for the electrodes of this invention can be satisfied. For example, the crosspieces may be arranged in the manner shown in FIG. 9 and FIG. 10.

Also, the backing plate is constructed on the basis that the size of the spaces divided by the crosspieces, is as large as possible from the point of the mechanical strength, but, on the other hand, they are as small as possible from the standpoint of electrical conductivity.

Figure 11:
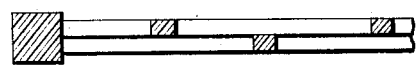
FIG. 11 is a cross sectional view of an embodiment of the support showing the positions of the crosspieces in the backing plate of this invention.

Furthermore, one plane of the frame need not always be in the same plane as that of the crosspiece, but may be of the configuration as shown in FIG. 11.

If the inside surfaces of the mold for molding the plastic backing plate of this invention are roughened by sand blasting or the like to form a fine unevenness on the surface of the molded backing plate to be brought into contact with the active material, the adhesion between the active material and the backing plate is improved and hence the retaining power of the backing plate for the active material is further improved.

Now, a practical example of the lattice-type backing plate shown in FIG. 1 prepared by using an acrylonitrile styrene resin will be explained.

The outline of the backing plate: 125 mm. x 112 mm. x 1.3 mm.

The width and the thickness of the frame were 5 mm. and 1.3 mm. respectively.

The cross section of the crosspiece used was a trapezoid having 0.3 mm. in top, 1.1 mm. in base, and 1.3 mm. in height and the number of the vertical crosspieces was 6 and the number of the horizontal crosspieces was 27. The thickness of the electrode after tamping a pasty active material to the backing plate was 1.5 mm. In this backing plate, about 65 g. of the active material was tamped.

As mentioned above, the present invention provides a backing plate for a paste type electrode of a lead battery using a plastic material and with or without using a current collector composed of lead or a lead alloy, the backing plate being lightweight and inexpensive and having properties that are not inferior to those of conventional backing plates composed of lead alloys. Moreover, the backing plate of the present invention can be readily produced industrially by using an ordinary plastic molding machine.

What is claimed is:

1. A backing plate for a paste-type electrode of a lead-acid battery comprising: a plastic support with a current outlet portion, said support having a frame with all plastic border walls (2) defining between surface planes thereof space for active conducting material, a plurality of separated crosspieces (3, 4) extending between two of the border walls of the frame and integrally connected therewith, the crosspieces being uniformly positioned in separate planar superposed layers, each crosspiece having a thickness substantially thinner than that of the frame, the crosspieces of the two planar superposed layers being no thicker than the frame, one surface of the crosspieces of the same layer spaced from one surface plane of the frame so that the active conducting material may be received therebetween, one surface of the crosspieces of the other layer spaced from the opposite surface plane of the frame, each layer of crosspieces having substantially the same number of crosspieces as the other layer, the crosspieces of each layer distributed substantially uniformly within the border walls of the frame, the crosspieces of the superposed layers contacting each other only at spaced apart points, and the border walls of said frame and both surface planes of the frame defining therebetween a continuous uninterrupted three dimensional space for receiving the continuous layer of active conducting material, such material being retained therein at least partially by contact with the crosspieces.

2. A backing plate for paste electrode of a lead-acid battery as claimed in claim 1 further comprising a current collector attached to the current outlet portion such that one end of the current collector is present in the space surrounded by the inside walls of the frame and both of the planes of the frame and the other end of the current collector extends outside of the frame.

3. A backing plate for a paste-type electrode of a lead-acid battery as claimed in claim 2 wherein the current outlet portion has at least one bridging member provided between the frame and an adjacent crosspiece, said bridging member having at least one perforation and a thickness thinner than that of the frame, at least one projection on the current collector adapted to be received within said perforation, said current collector mounted on the current outlet portion so that said projection extends into said perforation, and a deformed end of the projection at the opposite side of the bridging member to thereby attach the current collector to the current outlet portion.

4. A backing plate for paste-type electrode of a lead-acid battery as claimed in claim 2 wherein the ends of crosspieces adjacent to said current collector together with the frame define a space adjacent said current collector.

5. A backing plate for paste-type electrode of a lead-acid battery as claimed in claim 2 wherein the thickness of said current collector is thinner than that of the frame.

6. A backing plate for paste-type electrode for a lead-acid battery as claimed in claim 1 wherein said current outlet portion extends from a part of the frame of the supporting member, the space defined by said outlet portion being in communication with the space defined by the frame, and an active material in the space of the extended portion.

7. A backing plate for paste-type electrode of a lead-acid battery as claimed in claim 1 further comprising roughened surfaces of the supporting member to be brought into contact with an active material.

References Cited

UNITED STATES PATENTS

| | | | |
|---|---|---|---|
| 3,170,823 | 2/1965 | Geissbauer | 136—38 |
| 3,247,023 | 4/1966 | Geissbauer | 136—59 X |
| 3,516,863 | 6/1970 | Willmann et al. | 136—36 X |
| 3,516,864 | 6/1970 | Willmann | 136—36 X |
| 3,083,250 | 3/1963 | Geissbauer | 136—38 |

ALLEN B. CURTIS, Primary Examiner

C. F. LEFEVOUR, Assistant Examiner

U.S. Cl. X.R.

136—58, 63